United States Patent [19]

Schreder

[11] Patent Number: 4,695,708
[45] Date of Patent: Sep. 22, 1987

[54] ELECTRIC COOKER

[75] Inventor: Felix Schreder, Oberderdingen, Fed. Rep. of Germany

[73] Assignee: E.G.O. Elektro Geräte Blanc u. Fischer, Fed. Rep. of Germany

[21] Appl. No.: 863,600

[22] Filed: May 15, 1986

[30] Foreign Application Priority Data

May 21, 1985 [DE] Fed. Rep. of Germany ....... 3518124

[51] Int. Cl.$^4$ .............................................. H05B 1/02
[52] U.S. Cl. .................................... 219/486; 219/483; 219/508; 219/489; 307/38
[58] Field of Search ............... 219/483, 489, 484, 465, 219/486, 507, 508, 509, 511, 491, 446, 447, 448, 466; 307/39–41

[56] References Cited

U.S. PATENT DOCUMENTS

| 2,483,866 | 10/1949 | Ziola | 219/446 |
| 3,388,236 | 6/1968 | Holtkamp | 219/485 |
| 4,205,292 | 5/1980 | Goessler | 219/486 |
| 4,313,052 | 1/1982 | Fischer | 219/486 |
| 4,538,051 | 8/1985 | Schreder et al. | 219/446 |

FOREIGN PATENT DOCUMENTS

| 0679483 | 10/1982 | European Pat. Off. . |
| 2758465 | 7/1979 | Fed. Rep. of Germany . |
| 2943477 | 5/1981 | Fed. Rep. of Germany . |
| 3018416 | 11/1981 | Fed. Rep. of Germany . |
| 2045016 | 10/1980 | United Kingdom ................ 219/446 |

OTHER PUBLICATIONS

DE-Buch: Warschko/Husslein: Verlag E. Kieser KG: Elektrische Hausgerate, Augsburg 1959, S.109–112.

Primary Examiner—M. H. Paschall
Attorney, Agent, or Firm—Steele, Gould & Fried

[57] ABSTRACT

In the case of an electric cooker with at least two electric hotplates having several heating resistors and controlled via separate power control devices, one hotplate has a high power additional heating resistor for an initial cooking operation. While intermediately connecting a temperature switch and an additional contact of the associated power control device, the additional heating resistor is connected to the electric mains via a further additional contact. The further additional contact is a component of the power control device of the other electric hotplate and is only closed if its power consumption drops below a predetermined switching value.

11 Claims, 2 Drawing Figures

ELECTRIC COOKER

BACKGROUND OF THE INVENTION

The present invention relates to an electric cooker with at least two electric hotplates having a plurality of heating resistors and whereof at least one hotplate has an additional heating resistor which can be switched in by an additional contact of the associated power control device in an initial cooking or boiling phase, whereby said additional heating resistor can be switched off by a temperature switch on said electric hotplate at the end of the initial cooking or boiling phase.

Cooking units, such as built-in or flush cooking trays or hobs, ovens, etc. are generally equipped with two or more electric hotplates, which in each case have a predetermined maximum power consumption of e.g. between 1200 and 2000 W. The maximum power consumption in particular serves to permit initial cooking in a short time, i.e. the food being cooked can be brought from the cool state to a predetermined cooking temperature at which e.g. further cooking can then take place with a reduced power consumption. A two-plate oven can therefore arrive at a maximum total power consumption of e.g. up to 4 kW, whereas double this figure can be reached in the case of a four-plate oven. Both connected loads frequently draw more current than the mains current terminals are fused to accommodate at a normal level, assuming normally fused sockets, this particularly applying if the mains have a voltage of e.g. only approximately 120 V.

In order to reduce the resulting disadvantages and still provide a cooking unit with at least two electric hotplates which unit is simple to operate and which hotplates are fully utilizable at a low connected load, it has already been proposed to lay down an order of priority for the hotplates, the lower priority electric hotplate or hotplates only being supplied with current if the power consumption for the first-priority hotplate has been wholly or at least partly switched off due to the associated control or regulating process (cf. German Offenlegungsschrift No. 27 58 465). This construction is particularly suitable for cooking units, whose hotplates in each case have one or two separately switchable heating resistors.

In order to be able to carry out the initial cooking process in an even shorter time, electric hotplates are known (cf. European Pat. No. 0079483), provided with an additional heating resistor which can be switched in by an additional contact of the associated power control device for the maximum power consumption and whose maximum power consumption consequently exceeds the aforementioned values, so that when simultaneously operating two hotplates, whereof only one is operated with the additional heating resistor, an even higher connected load with the aforementioned disadvantages can occur.

SUMMARY OF THE INVENTION

The problem of the present invention is to provide an electric hotplate of the aforementioned type which, in the case of very short initial cooking time and simple operation, ensures a relatively low connected load with respect to its maximum total power consumption.

According to the invention this problem is solved by an electric cooker of the aforementioned type in that the additional contact of one electric hotplate is connected into the supply lead to the additional heating resistor of the other electric hotplate. The additional contact, which is appropriately operated by means of the same operating or control toggle or the like as the remaining settings of the power control device, is generally positioned in such a way that it is only closed at a higher power setting of the power control device than is chosen for keeping hot or the continued cooking of the food already heated in the initial cooking process. This higher power setting can also be the highest possible power setting of the power control device, i.e. can coincide with the maximum power consumption of the electric hotplate. The resulting initial cooking power consumption is very high, so that the initial cooking process takes place in a much shorter time than in the case of an electric hotplate without an additional heating resistor. For as long as the power setting of the first electric hotplate, whose additional contact is connected into the lead to the other hotplate, is above a predetermined value, said additional contact is open, so that the initial cooking additional heating means of the other second electric hotplate necessarily remains currentless, independently of its power setting. By choosing the level of the power consumption associated with this power setting value, in the case of simultaneous operation of both hotplates, the total connected load of the cooker can be set very low. As soon as the power setting of the first hotplate is below this value, the associated additional contact is closed, so that the additional heating resistor of the second electric hotplate can come into operation, provided that the associated power control device or the associated additional contact has manually been brought into the corresponding power setting. If this process has been carried out prior to the switching back of the first electric hotplate, then without any further operation with the operating toggle of the first hotplate, in practice the additional heating resistor of the other or second hotplate is connected in and is optionally connected out again in the same way. The additional contact of the first electric hotplate can consequently be exclusively an operating contact for the second hotplate. A very simple, obvious control in the case of an overall connected load to be kept low can in particular be achieved, while obtaining the aforesaid advantages and effects, if in the case of electric hotplates switchable by stepping switches in several power steps, one hotplate is designed without the additional heating resistor and is switchable by a stepping switch with additional contracts, which is connected into the lead to the additional heating resistor of the other hotplate. However, it is also conceivable to equip the first electric hotplate with an additional heating resistor, e.g. in such a way that both hotplates have essentially the same construction and the additional contact of the power control device of the first hotplate is arranged in such a way that in the case of a high power setting of said power control device, the additional heating resistor of the first hotplate is in operation and in the case of a lower power setting of the additional heating resistor the second hotplate is in operation. The arrangement can be such that there is a power setting range between said two power settings in which said additional contact closes neither of the two leads to the two additional heating means. In this case, the additional contact is appropriately constructed as a reversing switch, which has a corresponding idle position.

According to a further development of the invention at least one and preferably both electric hotplates are seven step timing hotplates with in each case three main heating resistors, which by means of an associated multi-timing switch can be switched in a conventional manner individually, in series and in parallel, so that e.g. six different power levels can be selected. Such a seven level timing switch is described in German Pat. No. 26 04 783 (British Pat. No. 15 77 852), to which reference is made. The additional contact of one or both power control devices can be contained in a separate adaptor or attached switch case, which is fitted to the housing of the operating side of the power control device and is traversed by its setting shaft in such a way that said switch can be operated with said shaft. Thus, existing power control devices, e.g. power regulators can be re-equipped to the construction of the invention.

These and further features of preferred further developments of the invention can be gathered from the description and drawings, whereby the individual features can be realized either individually or in the form of subcombinations in an embodiment of the invention and in other fields.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
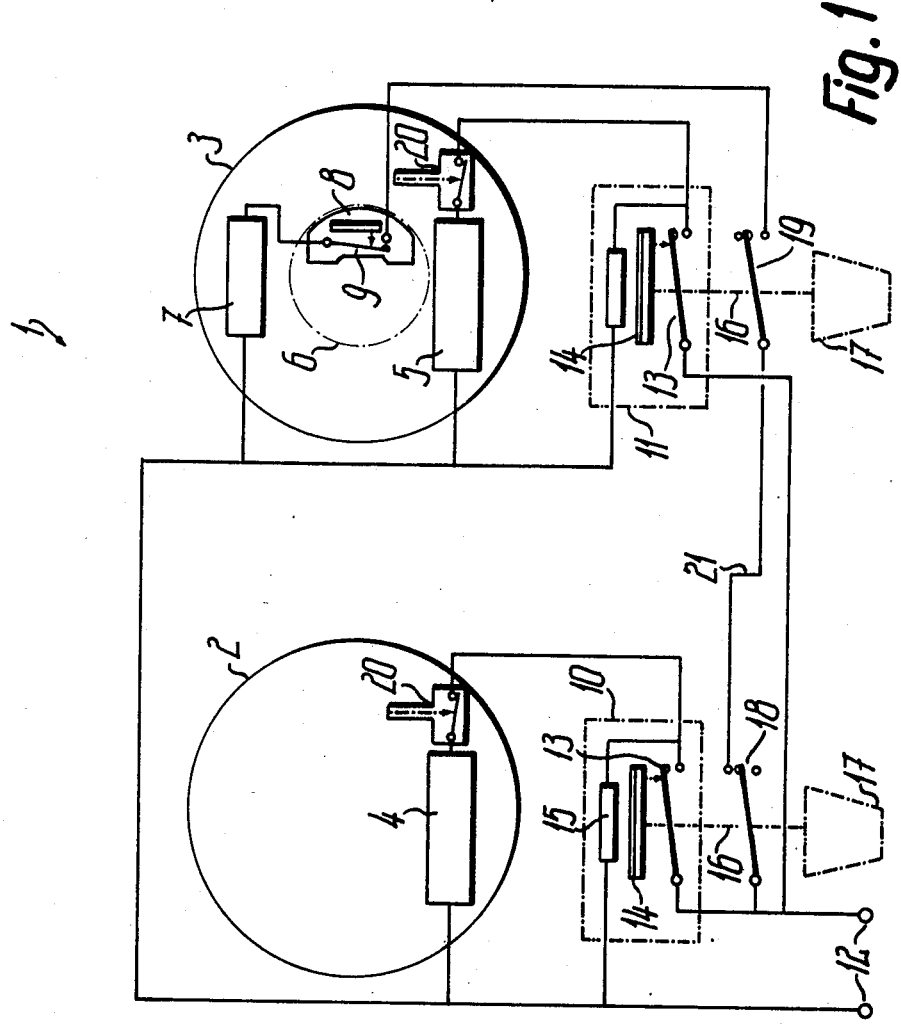
FIG. 1 is a diagrammatic circuit diagram of an electric cooker according to the invention.

FIG. 1 shows an electric cooker 1 with two electric hotplates 2, 3, which can be conventionally constructed and e.g. have a cast material hotplate body with an upper planar cooking surface. Each of the two juxtaposed hotplates 2, 3 has a main heating resistor 4, 5, which is e.g. spirally embedded in a slot on the bottom of the hotplate body in such a way that a central one 6 free from heating elements is left in the center of the hotplate body.

Whereas one, called the first electric hotplate 2 only has a single heating resistor 4, the other or second electric hotplate 3 is also provided with an additional heating resistor 7, which can be arranged in the same way as the main heating resistor 5, e.g. in the form of parallel spirals on the bottom of the hotplate 3 and which is also only provided in the ring region located outside the central zone 6. On the bottom of the hotplate body of said hotplate 3 a temperature switch 8 is arranged in the central zone 6 and is appropriately provided in a ceramic casing, which is crescent or sickle-shaped in plan view, with a bimetal and a snap-action switch 9 operated by the bimetal.

Heating resistor 4 of hotplate 2 is connected to the domestic mains 12 via a power control device 10, while the heating resistor 5 of the other hotplate 3 is connected thereto via a power control device 11. The power control devices 10, 11, which e.g. operate in a timed cyclic manner and which are appropriately identical, have in each case a snap-action switch 13, a bimetal 14 operating in the same way and a control heating means 15 for the bimetal and which is connected in series with the snap-action switch 13. The particular power control device 10 or 11 is continuously manually adjustable between two end positions by means of a setting shaft 16 having an operating knob or toggle 17.

The particular setting shaft additionally operates an additional contact 18 or 19 which, at least in the case of the power control device 11, can be closed upon reaching the power setting at which the keeping hot or heating range stops and the continued or finished cooking power begins, which e.g. in the case of a hotplate having a diameter of 180 mm is roughly at a power consumption of 300 W. In the case of a conventional scale division between 1 and 12 on the operating knob or toggle 17, said range starts at scale value 4. Additional contact 19 is in series with the snap-action switch 9 of temperature switch 8 and the additional heating resistor 9. This phase conductor with the additional heating means is consequently connected parallel to the main heating means and the power control device of hotplate 3 and is electrically independent of the latter.

With regards to hotplate 3, at a power setting of its own power control devicee 11 in the heating range, the additional contact 19 is open, which permits a very fine setting of low power consumptions of the main heating resistor 5. The hotplate 3 can be constructed and switched with the associated power control device 11 according to European Pat. No. 0079483, to which reference should be made for further details and features.

The main heating resistor 4, 5 of each electric hotplate 2, 3 is fused by a separate, additional thermal cutout 20, which ensures that a main heating means which may have been accidentally connected into a higher power step does not thermally damage the hotplate. Thermal cutout 20 can have a relatively low switching hysteresis. On setting a power level at which the additional contact 19 of power control device 11 is closed, then in addition to the particular partial power of the associated main heating resistor 5, the additional heating resistor 7 with its total predetermined heating power is connected in, so that there is a very rapid initial cooking process, but the power taken from the domestic mains 12 is relatively high. As a function of the coupling of the temperature switch 8 with the hotplate temperature, in greater or lesser dependence on the power taken following a predetermined time of e.g. roughly six minutes, temperature switch 8 will respond and the additional heating resistor 7 is switched off again. Even if subsequently for maintaining the cooking state the power is reduced by resetting the power control device 11, the temperature switch 8 remains switched off, so that the additional heating resistor 7 remains inactive until the hotplate is placed out of operation and has largely cooled. A relatively large hysteresis of temperature switch 8 is advantageous for this function.

The additional contact 18 of power control device 10 of hotplate 2 is connected via the lead 21 to the additional heating resistor 7 of hotplate 3, through the additional contact 19. If hotplate 2 is set to the full or almost full power consumption, then additional contact 18 is mechanically opened via setting shaft 16. Only if the setting of the power control device 10 has dropped back to below a predetermined value is additional contact 18 closed and consequently additional contact 19 is connected to power. As a function of whether additional contact 19 is open or closed in this case, the additional heating resistor 7 is made live either immediately upon the user selecting a corresponding setting of the associated power control device 11.

Figure 2:
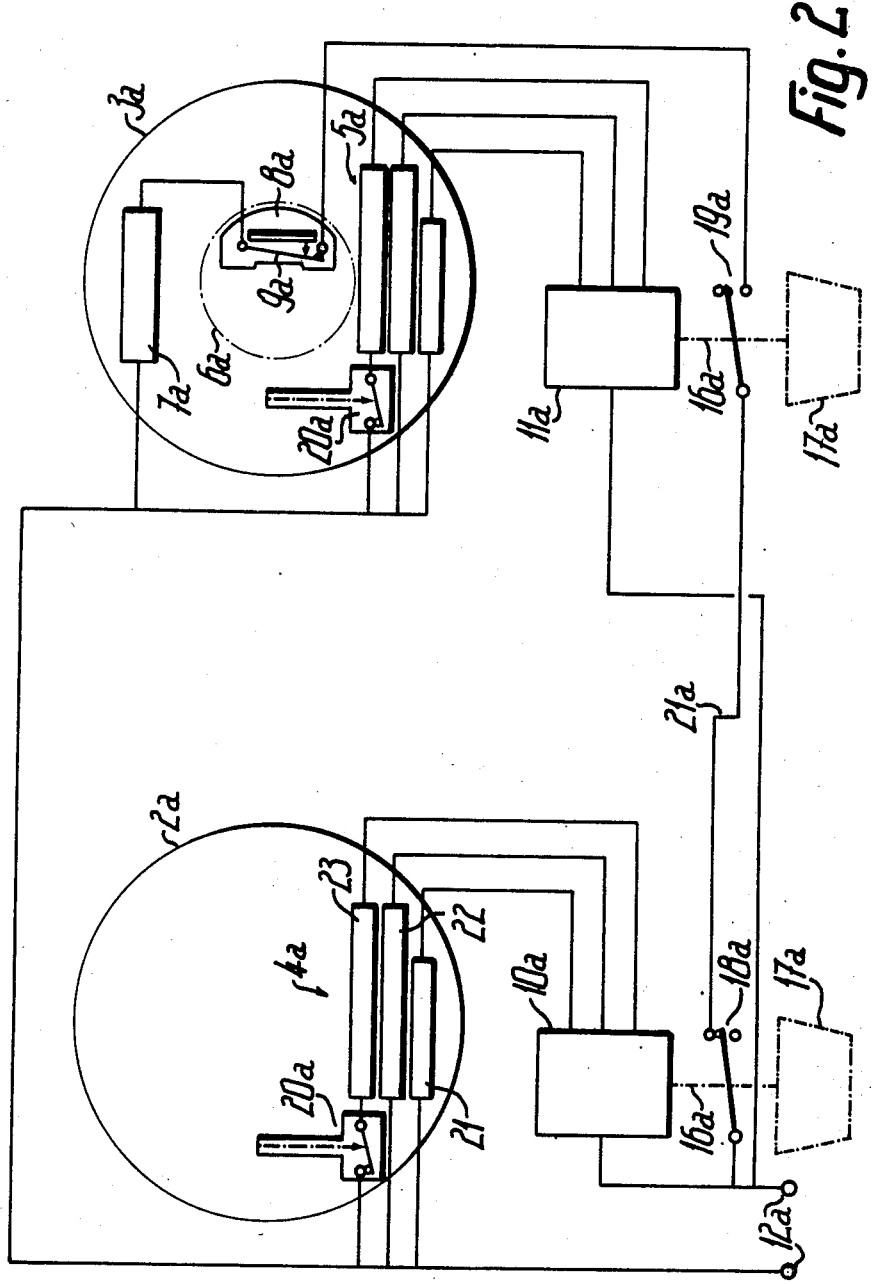
FIG. 2 is a second embodiment in a representation corresponding to FIG. 1.

In FIG. 2, corresponding parts are given the same reference numerals as in FIG. 1, but the letter "a" is added thereto. Hotplates 2a, 3a, whereof only one has an additional heating resistor 7a in series with temperature switch 8a and additional contact 19a of power control device 11a, are in each case equipped with a main heating means 4a, 5a, which is subdivided into three individual or separate heating resistors 21 to 23, which can e.g. be arranged in the form of three parallel, interengaging spirals in the described manner on the bottom of the associated hotplate body. The heating resistors 21 to 23 are separately connected to a power control device 10a or 11a in the form of a seven level timing switch and by rotating the setting shaft 16a are switchable in six power steps of the particular main heating means 4a or 5a. In the case of an electric hotplate with a diameter of 180 mm, e.g. the main heating means 4a or 5a can have 1200 W in the subdivisions 600, 400, 200 W and the additional heating resistor 7a can have 1300 W, so that there is a very broad range down to a low minimum non-zero power of only 110 W. In the same way as in FIG. 1, the additional heating resistor 7a is connected via temperature switch 8a and additional contact 19a parellel to the controllably connected conductors of the main heating means 5a and independently thereof. In one case the additional contact 19a is closed by the setting shaft 16a or a trip cam arranged thereon, if the associated power control device 11a is set at or beyond its maximum power step. The additional heating resistor 7a then cooperates in the described manner as an initial cooking means with temperature switch 8a. In another case a particularly fine setting is achieved if the switching in of the additional heating resistor 7a takes place at a lower power setting than the maximum power setting, e.g. at one of the higher power steps, particularly as from the start of the power step associated with the continued cooking range. However, the additional contact 18a of the power control device 10a of electric hotplate 2a is connected into the lead 21a to the additional heating resistor 7a, so that the previously described operation of the additional heating means of hotplate 3a, accompanied by a correspondingly suddenly increased power consumption, only occurs if the power control device 10a is set to a correspondingly low power range and consequently its additional contact 18a is closed.

Additional contact 18a or 19a can be integrated in a casing with in each case the associated power control device 10a or 11a in such a way that in place of a conventional seven level timing switch, an eight level timing switch is formed, which at least in its eighth timing position closes the integrated eighth switching contact, namely the associated additional contact 18a or 19a. The conventional mechanical switching contacts for the all-pole isolation of the hotplate from the mains in the off position are not shown.

What is claimed is:

1. An electric cooking unit, comprising:
   at least two electric hotplates, each of said hotplates having at least one main heating resistor connected to associated leads for electrical power supply thereto;
   manually-operable first and further power control devices for the electric hotplates, each of the power control devices being connected into the associated leads of said at least one main heating resistor of its respective electric hotplate and being provided to control said electric hotplate in an operating level ranging between a maximum and a minimum;
   at least one of the electric hotplates having an additional heating resistor connected to the associated leads for its electrical supply, for additional heating common with the main heating resistor of this electric hotplate during an initial cooking phase, said electric hotplate thereby defining an additional supplyable hotplate;
   a temperature switch responsive to said additional supplyable hotplate, said temperature switch being connected to deenergize said additional heating resistor above a predetermined temperature of said additional supplyable hotplate;
   a first contact for controlling the additional heating resistor, said first contact being provided for manual operation by operating the first power control device of the additional supplyable hotplate; and,
   an additional second contact for controlling the additional heating resistor, said second contact being connected for operation by operating a further power control device and being thereby connected into the lead to the additional heating resistor of the additional supplyable hotplate.

2. An electric cooking unit according to claim 1, wherein in operation of the unit the additional second contact is open when the electric hotplate of the associated further power control device is set in an operating level nearer to the maximum than to the minimum, said additional second contact being closed when said electric hotplate is set below said operating level.

3. An electric cooking unit according to claim 1, wherein the additional second contact is an operating contact carrying current exclusively for the additional supplyable hotplate.

4. An electric cooking unit according to claim 1, wherein the power control devices are constructed as stepwise settable switches for varying power supplied to the hotplates in different power steps, one of said at least two electric hotplates, apart from said additional supplyable hotplates, being constructed without an additional heating resistor to which power is supplied and being provided for operation by an associated stepping switch having the additional second contact, said additional second contact being connected into the lead to the additional heating resistor of the additional supplyable hotplate.

5. An electric cooking unit according to claim 1, wherein at least a first one of the electric hotplates is constructed as a seven-step controllable hotplate having three main heating resistors.

6. An electric cooking unit according to claim 5, wherein the seven-step controllable hotplate is provided with the additional heating resistor.

7. An electric cooking unit according to claim 5, wherein a second one of the electric hotplates is constructed as a seven-step controllable hotplate having three main heating resistors.

8. An electric cooking unit according to claim 7, wherein the stepping switch of the second electric hotplate is provided with the additional second contact.

9. An electric cooking unit according to claim 4, wherein the electric hotplate operable by the power control device operating the additional second contact is also provided with an additional heating resistor connected to associated leads for its electrical supply for additional heating common with the at least one main heating resistor of this electric hotplate during an initial cooking phase, said additional second contact being provided to alternately switch on one of the additional heating resistor of said electric hotplate at an operating level of said power controlled device above a predetermined value, on the one hand, and the additional heating resistor of the additional supplyable hotplate at an operating level of said power controlled device below this value, on the other hand.

10. An electric cooking unit according to claim 9, wherein the said operating levels are provided apart from each other, the additional second contact being in an inoperative state between said operating levels.

11. An electric cooking unit according to claim 1, wherein the additional contact of at least one power control device is part of a separate switch unit attached to an operating side of a switch unit comprising the power control device, said switch unit of the additional contact being traversed and operable by a setting shaft of said power control device.

* * * * *